United States Patent
Reed et al.

(10) Patent No.: US 9,948,580 B2
(45) Date of Patent: Apr. 17, 2018

(54) TECHNIQUES TO REPLICATE DATA USING UPLOADS FROM MESSAGING CLIENTS

(71) Applicant: WhatsApp Inc., Mountain View, CA (US)

(72) Inventors: Erik James Reed, Dublin, CA (US); Jamshid Mahdavi, San Jose, CA (US)

(73) Assignee: WHATSAPP INC., Menlo Park, CA (US)

( * ) Notice: Subject to any disclaimer, the term of this patent is extended or adjusted under 35 U.S.C. 154(b) by 183 days.

(21) Appl. No.: 14/745,335

(22) Filed: Jun. 19, 2015

(65) Prior Publication Data

US 2016/0373382 A1    Dec. 22, 2016

(51) Int. Cl.
*H04L 12/58* (2006.01)

(52) U.S. Cl.
CPC .............. *H04L 51/04* (2013.01); *H04L 51/32* (2013.01)

(58) Field of Classification Search
CPC .......... H04L 51/04; H04L 51/10; H04L 51/32
See application file for complete search history.

(56) References Cited

U.S. PATENT DOCUMENTS

| | | | |
|---|---|---|---|
| 7,693,958 B2 * | 4/2010 | Teodosiu | G06Q 10/107 |
| | | | 709/206 |
| 7,725,435 B1 * | 5/2010 | Li | G06F 17/30893 |
| | | | 707/626 |
| 2003/0083046 A1 * | 5/2003 | Mathis | H04L 12/1818 |
| | | | 455/412.1 |
| 2004/0088347 A1 * | 5/2004 | Yeager | H04L 67/104 |
| | | | 709/202 |
| 2004/0088348 A1 * | 5/2004 | Yeager | H04L 67/104 |
| | | | 709/202 |
| 2004/0088369 A1 * | 5/2004 | Yeager | H04L 67/104 |
| | | | 709/217 |
| 2004/0088646 A1 * | 5/2004 | Yeager | H04L 29/06 |
| | | | 715/229 |
| 2004/0133640 A1 * | 7/2004 | Yeager | G06F 9/4862 |
| | | | 709/204 |
| 2006/0173957 A1 * | 8/2006 | Robinson | G06Q 10/10 |
| | | | 709/204 |
| 2007/0005707 A1 * | 1/2007 | Teodosiu | G06Q 10/107 |
| | | | 709/206 |
| 2007/0055862 A1 * | 3/2007 | Sharma | H04L 63/0464 |
| | | | 713/150 |
| 2007/0087756 A1 * | 4/2007 | Hoffberg | G06Q 10/0631 |
| | | | 455/450 |

(Continued)

FOREIGN PATENT DOCUMENTS

KR    20080041905 A  *  5/2008

*Primary Examiner* — Kostas Katsikis

(57) ABSTRACT

An apparatus may include a messaging server component operative to determine a sharing event for a data item, the sharing event associated with a source client device with a local storage of the data item. The apparatus may request that the source client device upload the data item to a destination storage device in response to a determination that network storage of the data item is scheduled for relocation from a source storage device to the destination storage device. The apparatus may include a storage management component operative to determine that the network storage of the data item is scheduled for relocation from a source storage device to a destination storage device and de-schedule the relocation of the data item.

20 Claims, 10 Drawing Sheets

(56) References Cited

U.S. PATENT DOCUMENTS

| | | | | |
|---|---|---|---|---|
| 2007/0288524 A1* | 12/2007 | Luick | ................ | G06F 17/30575 |
| 2008/0005113 A1* | 1/2008 | Li | ................ | G06F 17/30209 |
| 2008/0022058 A1* | 1/2008 | Nadathur | ............ | G06F 11/1458 |
| | | | | 711/162 |
| 2008/0059565 A1* | 3/2008 | Turner | ................ | H04L 67/1095 |
| | | | | 709/203 |
| 2008/0059721 A1* | 3/2008 | Turner | ............. | G06F 17/30132 |
| | | | | 711/154 |
| 2008/0095373 A1* | 4/2008 | Nagata | .................... | H04L 63/10 |
| | | | | 380/278 |
| 2010/0185753 A1* | 7/2010 | Liu | .................... | H04L 65/4084 |
| | | | | 709/219 |
| 2010/0235285 A1* | 9/2010 | Hoffberg | .............. | G06Q 20/401 |
| | | | | 705/75 |
| 2012/0023223 A1* | 1/2012 | Branch | ................ | G06F 9/4856 |
| | | | | 709/224 |
| 2012/0221684 A1* | 8/2012 | Ferris | .................... | H04L 67/28 |
| | | | | 709/218 |
| 2013/0340089 A1* | 12/2013 | Steinberg | ................ | H04L 63/10 |
| | | | | 726/27 |
| 2014/0172783 A1* | 6/2014 | Suzuki | .................... | G06F 8/63 |
| | | | | 707/609 |
| 2014/0181436 A1* | 6/2014 | Modzelewski | ..... | G06F 11/2087 |
| | | | | 711/162 |
| 2015/0127636 A1* | 5/2015 | Hofstetter | .............. | G06Q 10/10 |
| | | | | 707/722 |
| 2015/0156159 A1* | 6/2015 | Hanson | .................... | H04W 4/14 |
| | | | | 709/204 |
| 2015/0350270 A1* | 12/2015 | Caras | ..................... | H04L 51/10 |
| | | | | 709/203 |
| 2015/0381525 A1* | 12/2015 | Roese | .................... | H04L 67/30 |
| | | | | 709/226 |
| 2016/0050289 A1* | 2/2016 | Cohen | .................. | H04L 67/306 |
| | | | | 709/204 |
| 2016/0080490 A1* | 3/2016 | Verma | ................ | H04L 67/1097 |
| | | | | 709/217 |
| 2016/0142350 A1* | 5/2016 | Mutha | .................... | H04L 51/08 |
| | | | | 709/206 |
| 2016/0323354 A1* | 11/2016 | Morse | .................... | H04L 67/02 |

* cited by examiner

500

Determine a sharing event for a data item, the sharing event associated with a source client device with a local storage of the data item.
502

Determine that network storage of the data item is scheduled for relocation from a source storage device.
504

Request the source client device upload the data item in response to the determination that network storage of the data item is scheduled for relocation.
506

De-schedule the relocation of the data item from the source storage device.
508

*FIG. 5*

TECHNIQUES TO REPLICATE DATA USING UPLOADS FROM MESSAGING CLIENTS

RELATED APPLICATIONS

This application is related to U.S. patent application Ser. No. 14/170,345, titled "Automated Message Recall from a Sender's Device," filed on Jan. 31, 2014, which is hereby incorporated by reference in its entirety.

BACKGROUND

Users of mobile devices, such as smartphones, may use their mobile devices to execute applications. These applications may perform communications and network tasks on behalf of their user. An application may comprise a messaging client for messaging between users. The messaging client may transmit media items to the messaging clients of other users using the messaging service.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to replicate data using uploads from messaging clients. Some embodiments are particularly directed to techniques to replicate data using uploads from messaging client using the messaging clients as distributed stores of data items. In one embodiment, for example, an apparatus may comprise a messaging server component operative to determine a sharing event for a data item, the sharing event associated with a source client device with a local storage of the data item, and request the source client device upload the data item in response to a determination that network storage of the data item is scheduled for relocation; and a storage management component operative to determine that the network storage of the data item is scheduled for relocation from a source storage device and de-schedule the relocation of the data item from the source storage. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 5 illustrates an embodiment of a logic flow for the system of FIG. 1.

DETAILED DESCRIPTION

Figure 1:
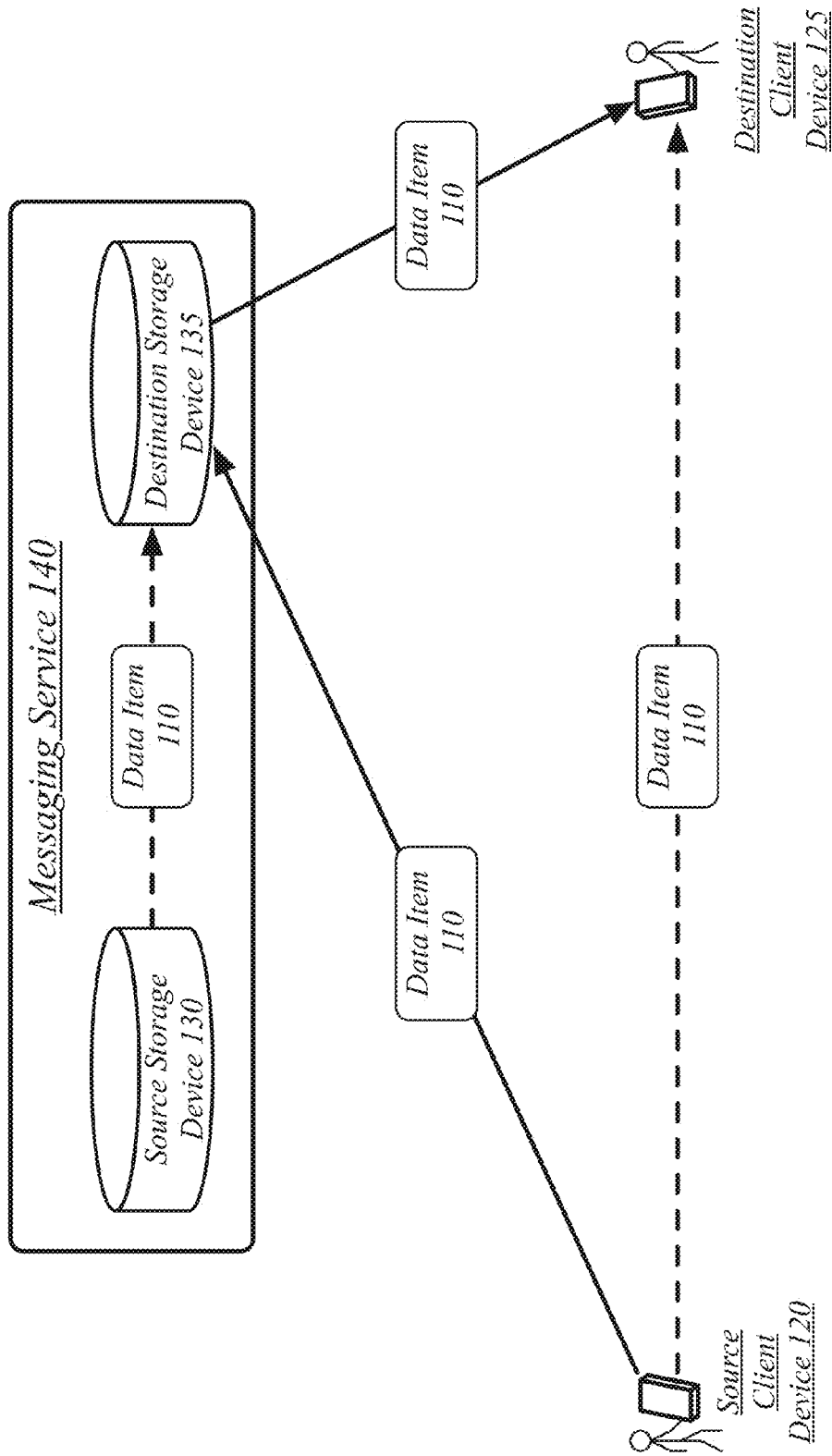
FIG. 1 illustrates an embodiment of a data replication system.

Users of a messaging service may exchange messages with each other. These messages may primarily be composed of text elements, but may also include other data items, such as media elements. A user may message another a message partially or entirely composed of a media element such as an image file, video file, or audio file. Where a destination messaging client—or multiple destination messaging clients, such as in the performance of a group conversation—is online, a message may be delivered immediately via the messaging service. Where one or more destination messaging clients are offline or otherwise unavailable, the messaging service may store the message for transmission to the one or more destination messaging clients once they are available.

Text exchanged between users of the messaging service may be sufficiently distinct—without necessarily being unique—and use sufficiently little storage space that each of the text elements received and stored may be distinctly maintained. However, a particular data item, particularly media elements, may be shared by different users in different conversations. Significant duplication (thousand- or million-fold) may occur when popular media is shared, but even less-popular media may be shared by multiple users. As such, a reduction in the storage used to store in-transit media may be achieved by storing only one copy—or perhaps a few copies for the most popular media—of any particular data item. Where one messaging client has already uploaded a data item as part of sending a message, another messaging client may refrain from uploading the data item itself. Multiple users sending duplicates of a data item may therefore serve to lower the bandwidth used overall in sending media messages.

This duplication may also be used to assist in the repair and transfer of data item storage. Where the in-transit data item has been lost to the messaging service—such as due to hardware failure—a messaging endpoint requesting to send that data item may upload a copy of it, with that uploaded data item being used not just for that messaging, but replacing the previously-lost copy for the performance of any in-transit messaging of the data item.

Similarly, a data item may be scheduled to be transmitted from one storage device to another. This may be a transfer between the storage devices of two storage servers within a data center, may be a transfer between data centers, or in any other scenario in which a data item is to be transferred from one storage device to another. This may be a duplication between two storage devices, within a data center, between data centers, or in any other scenario. Where a plurality of data items are scheduled for relocation, this relocation may be limited by the network bandwidth available for transmission out of the source storage device. As such, the relocation may be speeded by using the upload network bandwidth of devices requesting to message the data item: rather than transmit the data item from the source storage device to the destination storage device, the data item may be uploaded from a requesting messaging endpoint to the destination storage device. The sender of the data item may therefore receive the benefit of transmitting the data item through the messaging service while assisting the messaging service in data transfer or replication. Further, the most popular items may be replicated first, making them available for download at the destination storage device sooner, due to those items being sent out by client devices more frequently on account of their popularity. As a result, the embodiments can improve the affordability and scalability of operating a messaging service.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-a may include components 122-1, 122-2, 122-3, 122-4 and 122-5. The embodiments are not limited in this context.

FIG. 1 illustrates a block diagram for a data replication system 100. In one embodiment, the data replication system 100 may comprise a computer-implemented system having software applications comprising one or more components. Although the data replication system 100 shown in FIG. 1 has a limited number of elements in a certain topology, it may be appreciated that the data replication system 100 may include more or less elements in alternate topologies as desired for a given implementation.

A messaging service 140 may be generally arranged to receive, store, and deliver messages. The messaging service 140 may store messages while messaging endpoints, such as may execute on source client device 120 and destination client device 125, are offline and deliver the messages once the messaging endpoints are available.

A source client device 120 and destination client device 125 may execute messaging endpoints for the messaging service 140, wherein each of the client devices 120, 125 and their respective messaging endpoint are associated with a particular user of the messaging service 140. In some embodiments, the client devices 120, 125 may be cellular devices such as smartphones and may be identified to the messaging service 140 based on a phone number associated with each of the client devices 120, 125. In some embodiments, each messaging endpoint may be associated with a user account registered with the messaging service 140. In general, each messaging endpoint may be addressed through various techniques for the reception of messages, which may include the reception of media items. While in some embodiments the client devices 120, 125 may comprise cellular devices, in other embodiments one or more of the client devices 120, 125 may include personal computers, tablet devices, any other form of computing device without limitation.

The messaging service 140 may comprise a plurality of storage devices. The storage devices may be used to store messages, data items (including media elements), account information, address information, and various information related to the performance of messaging functions for the users of the messaging service 140. A source storage device 130 may store a data item 110, the data item 110 stored on the source storage device 130 to further the transmission of the data item 110 between users.

The data item 110 may be scheduled for relocation from the source storage device 130. This scheduling may be due to the source storage device 130 being scheduled for deactivation, such as may occur in the upgrading of storage hardware, the detection of incipient device failure, the deactivation of the host machine for the source storage device 130, or according to any other purpose for the temporary or permanent deactivation of the source storage device 130.

In some cases, a relocation of a data item 110 may maintain the data item 110 on the source storage device 130 so as to allow for the eventual re-activation of the source storage device 130 for serving the data item 110 (such as where a data center is undergoing temporary network problems and will eventually be brought back online), so as to allow the parallel serving of the data item 110 from both the source storage device 130 and a destination storage device 135 (such as where a data item 110 is particularly popular), or for any other purpose in maintaining the data item 110 on both the source storage device 130 and destination storage device 135.

In some embodiments, a destination storage device 135 may be predetermined to receive and host the data item 110, with this predetermined assignment recorded as part of the scheduling of the relocation of the data item 110 from the source storage device 130. In other embodiments, the destination storage device 135 may be determined at the time it is requested from the source client device 120 or upon the initiation of reception from the source client device 120. For the former, the source client device 120 may be given information to direct its upload to a correct destination storage device 135. For the latter, the source client device 120 may direct its upload to a front-end upload server with the upload redirected to the destination storage device 135 by the front-end upload server.

This scheduling may be due to a data center migration between the first data center and a second data center. For example, where a first data center is experiencing heavy load, network problems, or any other situation recommending a data center migration, data items stored at the first data center may be transmitted to the second data center so that they may be retrieved from the second data center. The data items may also remain at the first data center so that the first data center may continue to receive limited use and/or may resume its normal load once any problems have been resolved.

This scheduling may be due to an automated media messaging popularity prediction determining that the data item 110 is predicated to have a high media messaging rate. The messaging service 140 may analyze media messaging patterns and information related to media messaging and make predictions as to the future sharing of media items. For example, a media item, particular a new media item (e.g., an audio file of a newly-popular song, a video clip or image of a recent event), may see heavy initial usage that indicates that the media item will be popular for messaging. However, any technique for predicting a high media messaging rate may be used. In response to the predicted high media messaging rate the data item 110 may be replicated across a plurality of storage devices, including the destination storage device 135. Alternatively or additionally, the data item 110 may be replicated or moved to a higher-speed storage device or network storage server due to its predicted popularity. Multiple storage devices of the plurality of storage devices being used for replicated storage of the data item 110 may receive the data item 110 from client devices with local storage of the data item 110 requesting to message the data item 110.

The source client device 120 may request to transmit the data item 110 to the destination client device 125 via the messaging service 140. The request to transmit the data item 110 may consist of a message package transmitted via the Internet from the source client device 120 to the messaging service 140, the message package referencing the data item 110 without including the data item 110 in the message package. Where the messaging service 140 already stores a copy of the data item 110—such as it being stored for transmission to another client device as part of another messaging transaction—it may allow the source client device 120 to refrain from uploading the data item 110 and instead use the already-stored copy of the data item 110 to deliver the data item 110 to the destination client device 125.

However, where the data item 110 is scheduled for relocation the messaging service 140 may benefit from using the upload bandwidth of the source client device 120 to transmit the data item 110 to the destination storage device 135 instead of the upload bandwidth of the source storage device 130. As such, the messaging service 140 may request that the source client device 120 upload the data item 110 and direct the upload of the data item 110 to the destination storage device 135. Once received, the messaging service 140 may make the copy of the data item 110 stored at the destination storage device 135 available to the destination client device 125 for download to complete the messaging of the data item 110 from the source client device 120 to the destination client device 125.

Figure 2:
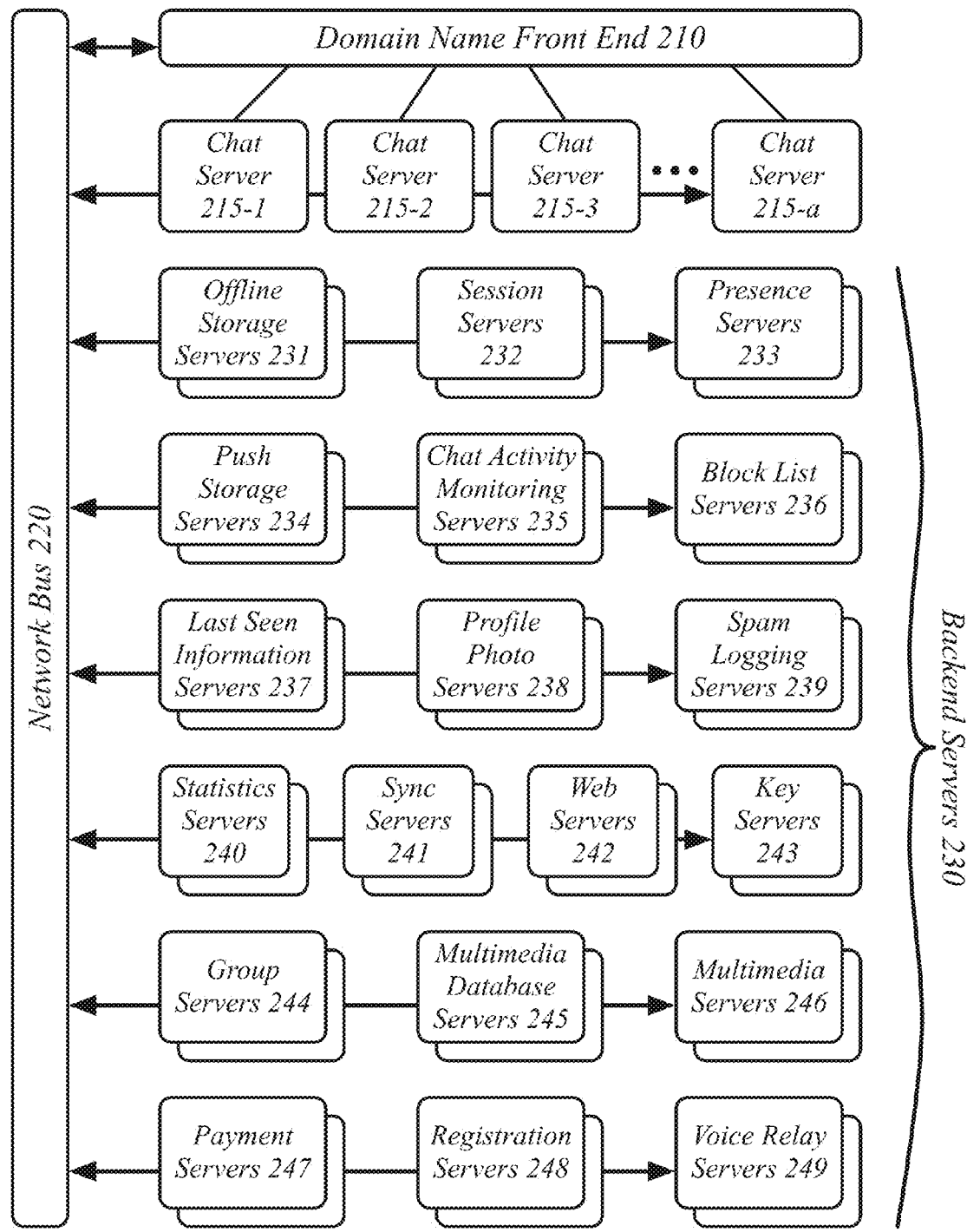
FIG. 2 illustrates an embodiment of a messaging system.

FIG. 2 illustrates an embodiment of a plurality of servers implementing various functions of a messaging system 200. It will be appreciated that different distributions of work and functions may be used in various embodiments of a messaging system 200. The messaging system 200 may comprise the data replication system 100 with the operations of the data replication system 100 comprising a portion of the overall operations of the messaging system 200.

The messaging system 200 may comprise a domain name front end 210. The domain name front end 210 may be assigned one or more domain names associated with the messaging system 200 in a domain name system (DNS). The domain name front end 210 may receive incoming connections and distribute the connections to servers providing various messaging services.

The messaging system 200 may comprise one or more chat servers 215. The chat servers 215 may comprise front-end servers for receiving and transmitting user-to-user messaging updates such as chat messages. Incoming connections may be assigned to the chat servers 215 by the domain name front end 210 based on workload balancing.

The messaging system 200 may comprise backend servers 230. The backend servers 230 may perform specialized tasks in the support of the chat operations of the front-end chat servers 215. A plurality of different types of backend servers 230 may be used. It will be appreciated that the assignment of types of tasks to different backend serves 230 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging system 200 may comprise one or more offline storage servers 231. The one or more offline storage servers 231 may store messaging content for currently-offline messaging endpoints in hold for when the messaging endpoints reconnect.

The messaging system 200 may comprise one or more sessions servers 232. The one or more session servers 232 may maintain session state of connected messaging endpoints.

The messaging system 200 may comprise one or more presence servers 233. The one or more presence servers 233 may maintain presence information for the messaging system 200. Presence information may correspond to user-specific information indicating whether or not a given user has an online messaging endpoint and is available for chatting, has an online messaging endpoint but is currently away from it, does not have an online messaging endpoint, and any other presence state.

The messaging system 200 may comprise one or more push storage servers 234. The one or more push storage servers 234 may cache push requests and transmit the push requests to messaging endpoints. Push requests may be used to wake messaging endpoints, to notify messaging endpoints that a messaging update is available, and to otherwise perform server-side-driven interactions with messaging endpoints.

The messaging system 200 may comprise one or more chat activity monitoring servers 235. The one or more chat activity monitoring servers 235 may monitor the chats of users to determine unauthorized or discouraged behavior by the users of the messaging system 200. The one or more chat activity monitoring servers 235 may work in cooperation with the spam logging servers 239 and block list servers 236, with the one or more chat activity monitoring servers 235 identifying spam or other discouraged behavior and providing spam information to the spam logging servers 239 and blocking information, where appropriate to the block list servers 236.

The messaging system 200 may comprise one or more block list servers 236. The one or more block list servers 236 may maintain user-specific block lists, the user-specific incoming-block lists indicating for each user the one or more other users that are forbidden from transmitting messages to that user. Alternatively or additionally, the one or more block list servers 236 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging system 200 may comprise one or more last seen information servers 237. The one or more last seen information servers 237 may receive, store, and maintain information indicating the last seen location, status, messaging endpoint, and other elements of a user's last seen connection to the messaging system 200.

The messaging system 200 may comprise one or more profile photo servers 238. The one or more profile photo servers 238 may store and make available for retrieval profile photos for the plurality of users of the messaging system 200.

The messaging system 200 may comprise one or more spam logging servers 239. The one or more spam logging servers 239 may log known and suspected spam (e.g., unwanted messages, particularly those of a promotional nature). The one or more spam logging servers 239 may be operative to analyze messages to determine whether they are spam and to perform punitive measures, in some embodiments, against suspected spammers (users that send spam messages).

The messaging system 200 may comprise one or more statistics servers 240. The one or more statistics servers may compile and store statistics information related to the operation of the messaging system 200 and the behavior of the users of the messaging system 200.

The messaging system 200 may comprise one or more sync servers 241. The one or more sync servers 241 may sync the messaging system 240 with contact information from a messaging endpoint, such as an address book on a mobile phone, to determine contacts for a user in the messaging system 200.

The messaging system 200 may comprise one or more web servers 242. The one or more web servers 242 may engage in hypertext transport protocol (HTTP) and hypertext transport protocol secure (HTTPS) connections with web browsers. The one or more web servers 242 may, in some embodiments, host the remote web server 350 as part of the operation of the messaging web access system 100.

The messaging system 200 may comprise one or more key servers 243. The one or more key servers 243 may host public keys for public/private key encrypted communication.

The messaging system 200 may comprise one or more group servers 244. The one or more group servers 244 may maintain lists of groups, add users to groups, remove users from groups, and perform the reception, caching, and forwarding of group chat messages.

The messaging system 200 may comprise one or more multimedia database (MMD) servers 245. The MMD servers 245 may store a database, which may be a distributed database, of media objects known to the messaging system 200. In some embodiments, only media objects currently stored or otherwise in-transit within the messaging system 200 may be tracked by the MMD servers 245. In other embodiments, the MMD servers 245 may maintain a record of media objects that are no longer in-transit, such as may be for tracking popularity or other data-gathering purposes.

The MMD servers 245 may determine the storage location of media objects when they are to be stored by the messaging system 200, such as on multimedia servers 246. The MMD servers 245 may determine the existing storage location of media objects when they are to be transmitted by the messaging system 200, such as which of a plurality of multimedia servers 236 store a particular media object. The MMD servers 245 may generate the uniform resource locators (URLs) for use by messaging clients to request and retrieve media objects. The MMD servers 245 may track when a media object has been corrupted or otherwise lost and should be reacquired.

The messaging system 200 may comprise one or more multimedia servers 246. The one or more multimedia servers may store multimedia (e.g., images, video, audio) in transit between messaging endpoints, multimedia cached for offline endpoints, and may perform transcoding of multimedia.

The messaging system 200 may comprise one or more payment servers 247. The one or more payment servers 247 may process payments from users. The one or more payment servers 247 may connect to external third-party servers for the performance of payments.

The messaging system 200 may comprise one or more registration servers 248. The one or more registration servers 248 may register new users of the messaging system 200.

The messaging system 200 may comprise one or more voice relay servers 249. The one or more voice relay servers 249 may relay voice-over-internet-protocol (VoIP) voice communication between messaging endpoints for the performance of VoIP calls.

Figure 3:
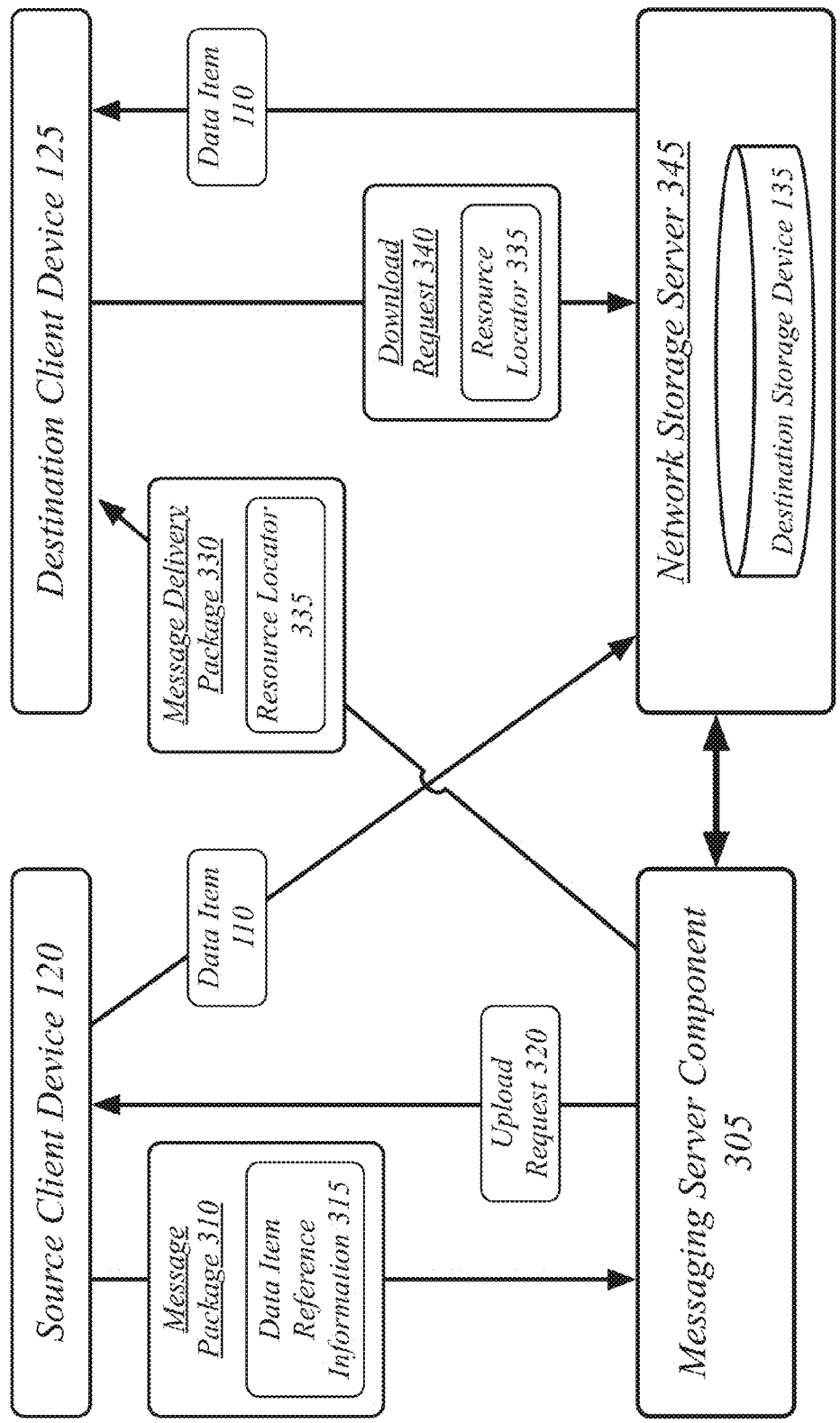
FIG. 3 illustrates an embodiment of a data item upload being used to perform data replication.

FIG. 3 illustrates an embodiment of a data item upload being used to perform data replication.

A messaging server component 305 may generally correspond to one of the chat servers 215 described with reference to FIG. 2. The messaging server component 305 may be generally arranged to act as a front-end server for the performance of messaging services for client devices of the messaging service 140.

A network storage server 345 may generally correspond to one of the multimedia servers 246 described with reference to FIG. 2. The network storage server 345 may comprise the destination storage device 135 and be at least one planned storage location for the data item 110.

The source client device 120 may transmit a message package 310 to the messaging server component 305, the message package 310 comprising data item reference information 315 describing the data item 110 requested for transmission to the destination client device 125. A request to transmit the data item 110 to the destination client device 125 may be addressed according to a phone number for the second client device 125, a user account for the user of the second client device 125, or according to any other technique for addressing a message that corresponds to the data item 110 being made available to the destination client device 125 as part of messaging the destination client device 125. In some embodiments, the identification of the destination client device 125 may be included in the message package 310. In other embodiments, the identification of the destination client device 125 may be received in a different messaging step so as to disentangle the transmission of the message package 310 from the specification of a destination and thereby increase the privacy of the messaging service 140.

The messaging server component 305 may transmit an upload request 320 to the source client device 120. The upload request 320 may be transmitted in response to a determination, based on the data item reference information 315, that the messaging service 140 does not currently store the data item 110. Alternatively, the upload request 320 may be transmitted in response to a determination, based on the data item reference information 315, that the messaging service 140 currently stores the data item 110 but that the data item 110 is scheduled for relocation from the source storage device 130.

The source client device 120 may transmit the data item 110 to the network storage server 345 in response to the upload request 320. The upload request 320 may specify that the data item 110 is to uploaded to the network storage server 345 for the destination storage device 135. Alternatively, the upload request 320 may merely request the uploading of the data item 110 with the messaging service 140 directing the upload to the network storage server 345 in order to achieve the storage of the data item 110 on the destination storage device 135.

The messaging server component 305 may transmit a message delivery package 330 to the destination client device 125. Where the message package 310 included additional messaging content beyond the data item 110, such as a text element, the message delivery package 330 may include this additional messaging content. The message delivery package 330 may include a resource locator 335, the resource location 335 identifying a network location for the retrieval of the data item 110, as may be hosted by the messaging service 140. The resource locator 335 may comprise a uniform resource locator (URL). The messaging server component 305 may, in some embodiments, refrain from transmitting the message delivery package 330 until the data item 110 is available from the destination storage device 135 via the network storage server 345.

The destination client device 125 may receive the message delivery package 330. The user of the destination client device 125 may be notified of the receipt of the message composed within the message delivery package 330. The user of the destination client device 125 may be displayed any text elements contained within the message delivery package 330 and notified that the data item 110 is available for downloading and perception (e.g., viewing, hearing) by the user. The user may request the data item 110. Alternatively, in some embodiments and cases, a messaging client may automatically request the data item 110 without a specific user prompt. In response to this request, the destination client device 125 may transmit a download request 340 to the network storage server 345, the download request 340 comprising the resource locator 335. In some embodiments the download request 340 may comprise a hypertext transport protocol (HTTP) request for the data item 110, the resource locator 335 the URL for the HTTP request. The network storage server 345 may receive the download request 340 from the destination client device 125, retrieve the data item 110 from the destination storage device 135, and transmit the data item 110 to the destination client device 125 in response to download request 340, using the resource locator 335 to identify the data item 110 from a plurality of data items stored on the destination storage device 135 or another storage device accessible to the network storage server 345 for the retrieval of data items.

Figure 4:
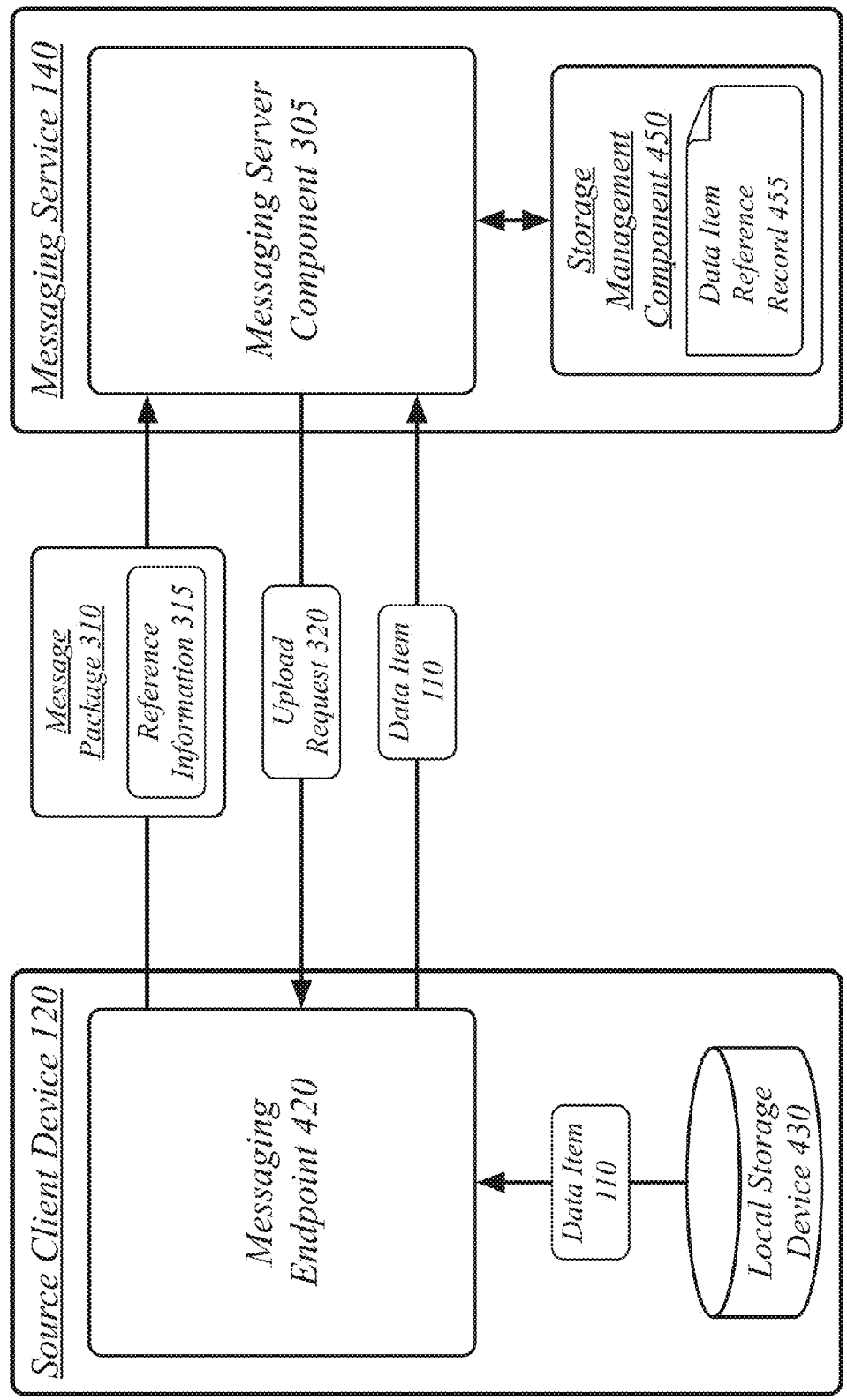
FIG. 4 illustrates an embodiment of a message submission from a messaging endpoint to a messaging service.

FIG. 4 illustrates an embodiment of a message submission from a messaging endpoint 420 to a messaging service 140.

The source client device 120 may comprise a message endpoint 420, the messaging endpoint 420 generally arranged to operate with the messaging service 140 for the performance of messaging for the user of the source client device 120. The source client device 120 may comprise a local storage device storing the data item 110. The messaging endpoint 420 may transmit a message package 310 to a messaging server component 305, the message package 210 comprising reference information 315 for the data item 110. The messaging endpoint 420 may receive an upload request 320 from the messaging server component 305, the upload request 320 received in response to a determination that the data item 110 is scheduled for relocation from a source storage device 130. The messaging endpoint 420 may upload the data item 110 in response to the upload request 320.

A storage management component 450 may be generally arranged to manage the storage of data items for the messaging service 140. The storage management component 450 may maintain information identifying the data items stored for transmission via the messaging service 140. The storage management component 450 may record for each data item 110 a number of references to the data item 110, corresponding to the number of messages referencing the data item 110 that have not yet resulted in a download of the data item 110, such as may result from the messages having not yet been delivered or having been delivered but without the destination messaging endpoint having downloaded the data item 110. This number of references may therefore correspond to a number of messages for which the data item 110 is being held to be available for download.

A messaging server component 305 may determine a sharing event for a data item 110. The sharing event may be associated with a source client device 120 with a local storage of the data item 110. The sharing event may correspond to a messaging of the data item 110 from the source client device 120 to the destination client device 125 using the messaging service 140. The sharing event may correspond to an initial attempt by the source client device 120 to message the data item 110 to a user on the destination client device 135.

Alternatively, the sharing event may correspond to a re-upload of the data item 110 by the source client device 120. Where a data item 110 has been lost—such as due to the corruption of the source storage device 130, or simply because the data item 110 was removed due to age—the messaging service 140 may attempt to repair the loss. In some cases, a deactivation of the source storage device 130 may be prompted by data losses such as a corruption of a data item 110 stored on the source storage device 130. The repair may be performed by detecting that a different client device is attempting to upload the data item 110 from a previous client device that uploaded the copy of data item 110 that was lost and requesting that the different client device upload the data item 110. In some embodiments, a receiving messaging endpoint or the messaging service 140 may be empowered to request that a sending messaging endpoint re-upload a data item 110 to the messaging service 140 to repair the loss of the data item 110. The messaging system 140 may use the repair upload to store the data item 110 on the destination storage device 135.

A storage management component 450 may determine that network storage of the data item 110 is scheduled for relocation from a source storage device 130, the network storage associated with the messaging service 140. The messaging server component 305 may request the source client device 120 upload the data item 110 in response to a determination that network storage of the data item is scheduled for relocation from the source storage device 130, the request that the source client device 120 upload the data item 110 to the destination storage device 135 part of the performance of the messaging of the data item 110. The messaging service 140 may receive the data item 110 from the source client device 120 and store the data item 110 on the destination storage device 135.

The storage management component 450 may de-schedule relocation of the data item 110 from the source storage device 130 to the destination storage device 135 in response to receiving the data item 110 from the source client device 120. Alternatively, the storage management component 450 may de-schedule relocation of the data item 110 from the source storage device 130 to the destination storage device 135 in response to requesting that the source client device 120 upload the data item 110. This relocation may be de-scheduled based on the data item 110 having been effectively relocated thanks to the upload from the source client device 120. The former solution waits to de-schedule until the new copy of the data item 110 is retrieved, thereby keeping the relocation scheduled until it has been confirmed to be absolutely necessary. The latter solution prevents the direct relocation within the messaging service 140 from possibly-unnecessarily happening during the delay between the upload request 320 and the actual upload. In some embodiments, the data item 110 may be marked as having been requested from a source client device 120 once the upload request 320 is sent to avoid requesting an upload from another client device 120. In other embodiments, multiple upload requests for the data item 110 may be permitted so that the data item 110 is transferred as soon as possible by whatever client device completes an upload of the data item 110 first. Marking a data item 110 as being requested for upload may include a clean up stage in which data items that have been requested for upload, but have not yet been received after a predefined threshold amount of time (e.g., 15 minutes), are returned to a state in which they will again be requested for upload due to the previously-requested upload having timed out.

The messaging server component 305 may receive a message package 310 from the source client device 120, the message package 310 comprising data item reference information 315. The data item reference information 315 may comprise a data item hash of the data item 110 and a storage length of the data item 110. The data item hash may be a hash of the data item 110 using one of any known hashing technique. The hashing of any given data item 110 always produces the same data item hash, though not necessarily a unique number corresponding to the particular data item 110 due to the data item hash being significantly shorter than the data item 110. However, the storage length of the data item 110 and the data item hash may be sufficient information to practically identify a particular data item 110 and thereby determine that a message package 310 contains a request to message that particular data item 110.

The messaging service 140 may maintain identifiers for data items and may be operative to determine a unique data item identifier for the data item 110 based on the data item hash and the storage length of the data item 110, the data item identifier uniquely identifying the data item 110. The storage management component 450 may identify that the network storage contains the data item 110 and that data item 110 is scheduled for relocation based on the data item identifier.

A data item reference record 455 may maintain a record of data items known to the messaging service 140 and/or data items currently stored by the messaging service 140. The data item reference record 455 may maintain a record of how many references to each data item are still active and what messages reference it. The data item reference record 455 may mark what data items are scheduled for relocation between storage devices. The storage management component 450 may compare the data item identifier to the data item reference record 455 and identify that the network storage contains the data item 110 and that the data item 110 is scheduled for relocation from the source storage device 130 based on the data item reference record 455.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 may determine a sharing event for a data item, the sharing event associated with a source client device with a local storage of the data item at block 502.

The logic flow 500 may determine that network storage of the data item is scheduled for relocation from a source storage device at block 504.

The logic flow 500 may request the source client device upload the data item in response to the determination that network storage of the data item is scheduled for relocation at block 506.

The logic flow 500 may de-schedule the relocation of the data item from the source storage device at block 508.

The embodiments are not limited to this example.

Figure 6:
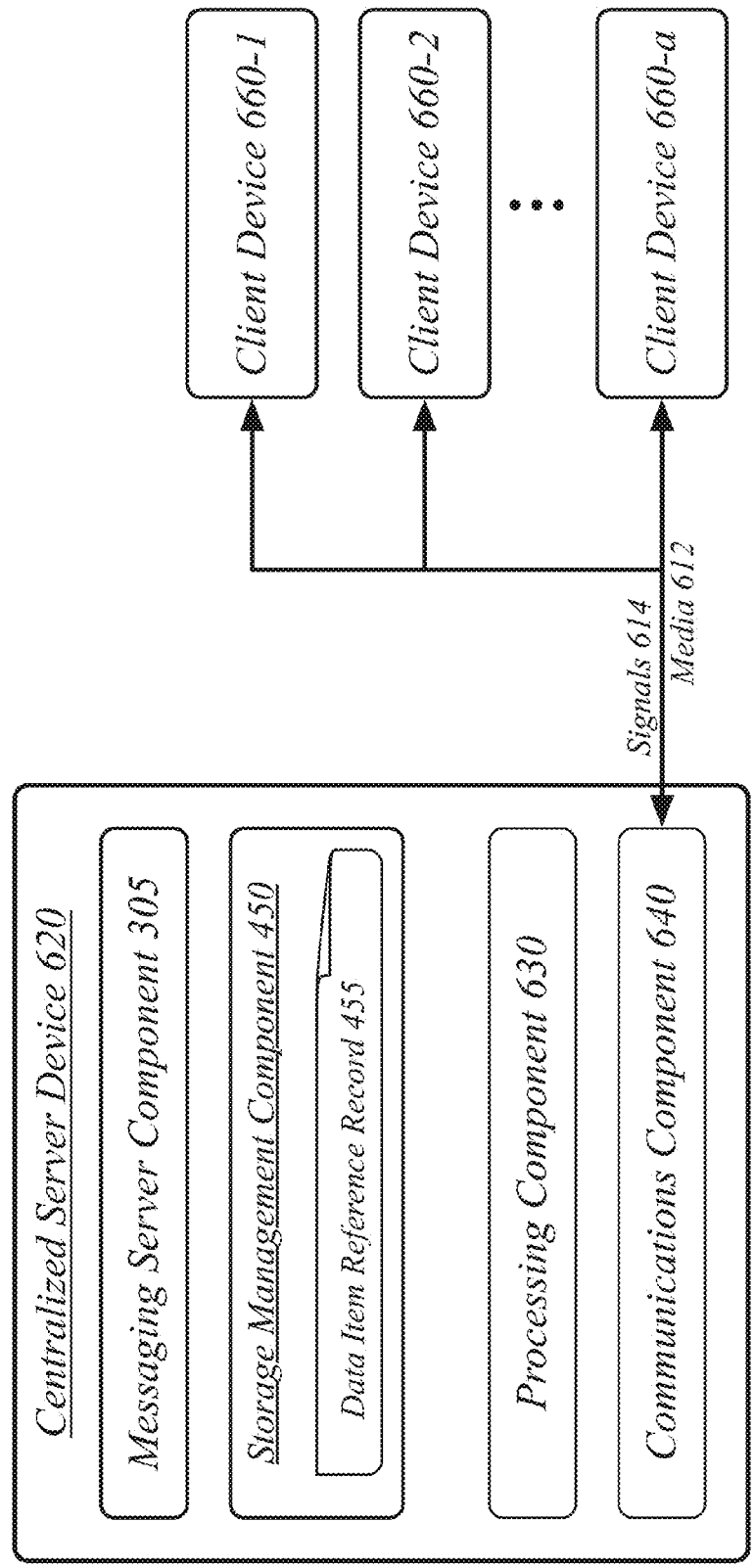
FIG. 6 illustrates an embodiment of a centralized system for the system of FIG. 1.

FIG. 6 illustrates a block diagram of a centralized system 600. The centralized system 600 may implement some or all of the structure and/or operations for the data replication system 100 in a single computing entity, such as entirely within a single centralized server device 620.

The centralized server device 620 may comprise any electronic device capable of receiving, processing, and sending information for the data replication system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 620 may execute processing operations or logic for the data replication system 100 using a processing component 630. The processing component 630 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 620 may execute communications operations or logic for the data replication system 100 using communications component 640. The communications component 640 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 640 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 612, 642 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 620 may implement both the messaging server component 305 and the storage management component 450. The centralized server device 620 may communicate with the a plurality of client devices 660, such as may include source client device 120 and destination client device 125, over a communications media 612 using communications signals 614 via the communications component 640.

Figure 7:
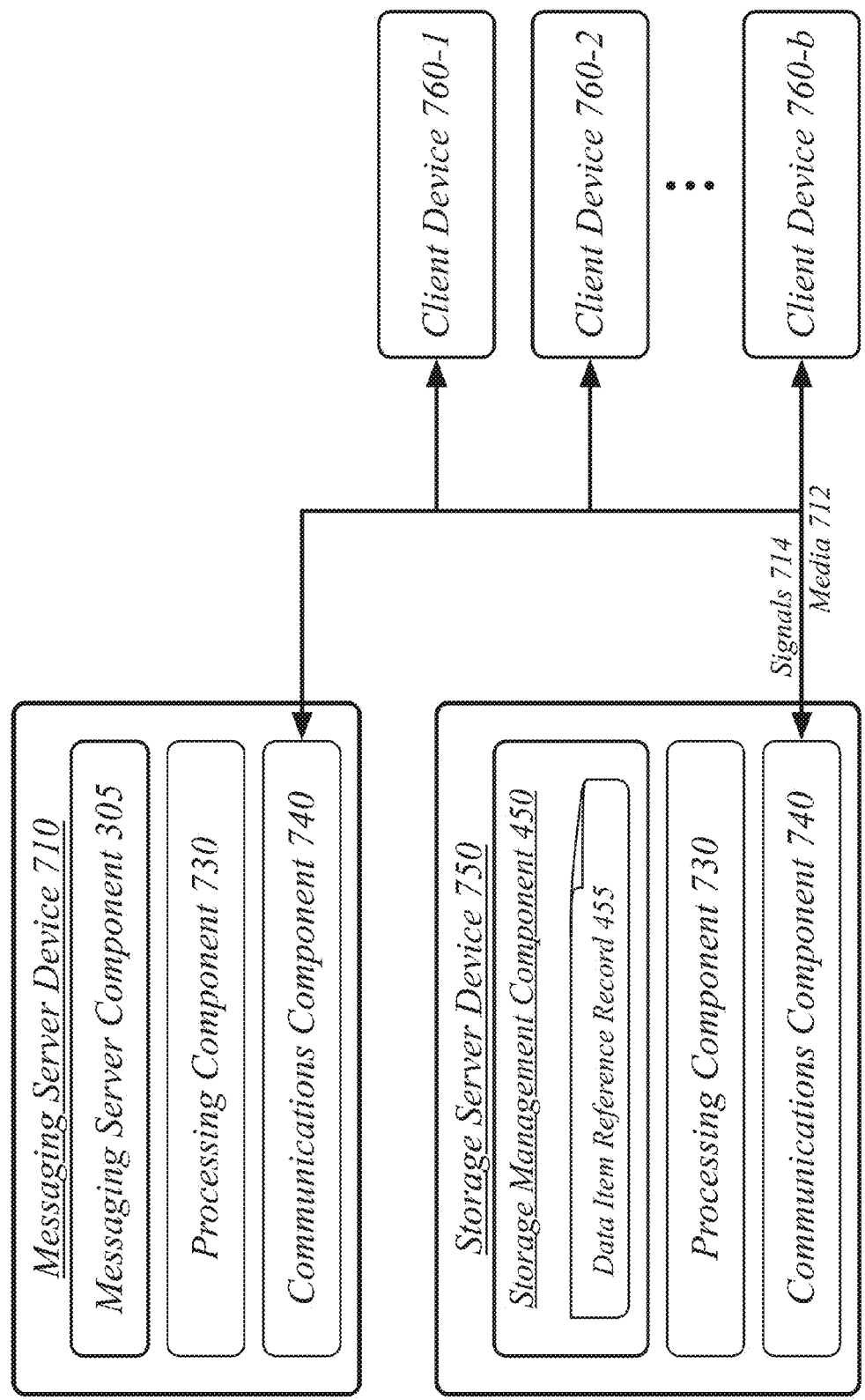
FIG. 7 illustrates an embodiment of a distributed system for the system of FIG. 1.

FIG. 7 illustrates a block diagram of a distributed system 700. The distributed system 700 may distribute portions of the structure and/or operations for the data replication system 100 across multiple computing entities. Examples of distributed system 700 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 700 may comprise a messaging server device 710 and a storage server device 750. In general, the messaging server device 710 and the storage server device 750 may be the same or similar to the centralized server device 620 as described with reference to FIG. 6. For instance, the messaging server device 710 and the storage server device 750 may each comprise a processing component 730 and a communications component 740 which are the same or similar to the processing component 630 and the communications component 640, respectively, as described with reference to FIG. 6. In another example, the devices 710, 750 may communicate over a communications media 712 using communications signals 714 via the communications components 740.

The messaging server device 710 may comprise or employ one or more client programs that operate to perform various methodologies in accordance with the described embodiments. In one embodiment, for example, the messaging server device 710 may implement the messaging server component 305.

The storage server device 750 may comprise or employ one or more server programs that operate to perform various methodologies in accordance with the described embodiments. In one embodiment, for example, the storage server device 750 may implement the storage management component 450.

The messaging server device 710 and the storage server device 750 may communicate with the a plurality of client devices 760, such as may include source client device 120 and destination client device 125, over the communications media 712 using communications signals 714 via the communications components 740.

Figure 8:
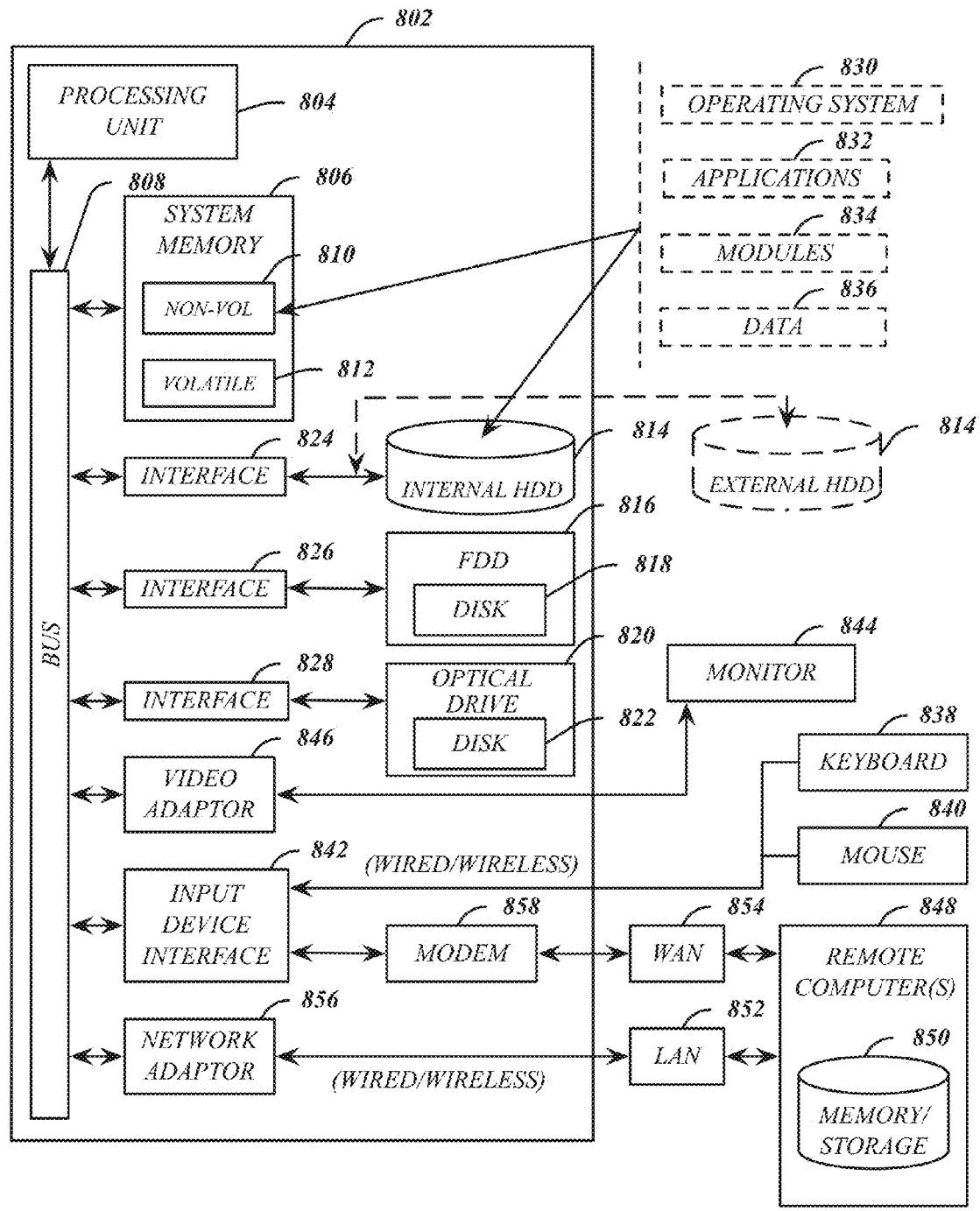
FIG. 8 illustrates an embodiment of a computing architecture.

FIG. 8 illustrates an embodiment of an exemplary computing architecture 800 suitable for implementing various embodiments as previously described. In one embodiment, the computing architecture 800 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 804, a system memory 806 and a system bus 808. The processing unit 804 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 804.

The system bus 808 provides an interface for system components including, but not limited to, the system memory 806 to the processing unit 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computer 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the data replication system 100.

A user can enter commands and information into the computer 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet.

When used in a LAN networking environment, the computer 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.8 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.8x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
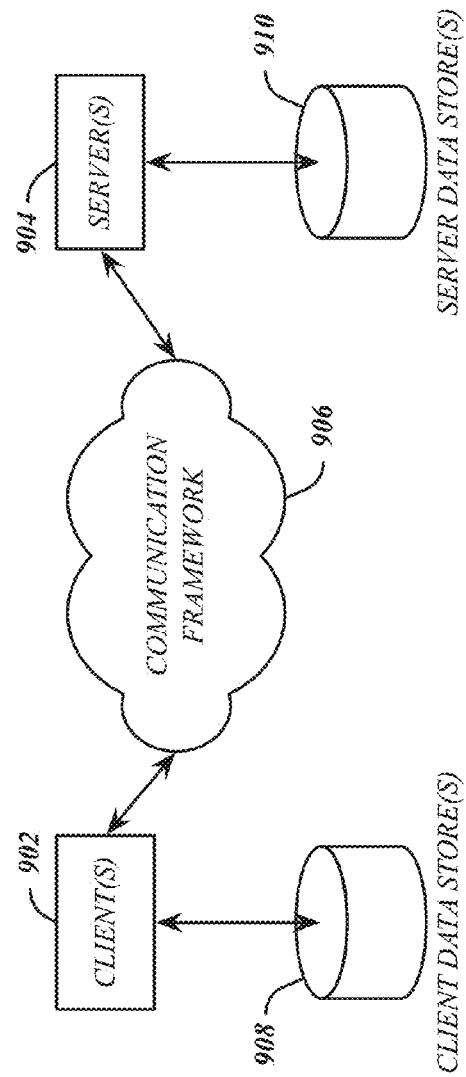
FIG. 9 illustrates an embodiment of a communications architecture.

FIG. 9 illustrates a block diagram of an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. The clients 902 may implement the client device 910. The servers 904 may implement the server device 950. The clients 902 and the servers 904 are operatively connected to one or more respective client data stores 908 and server data stores 910 that can be employed to store information local to the respective clients 902 and servers 904, such as cookies and/or associated contextual information.

The clients 902 and the servers 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
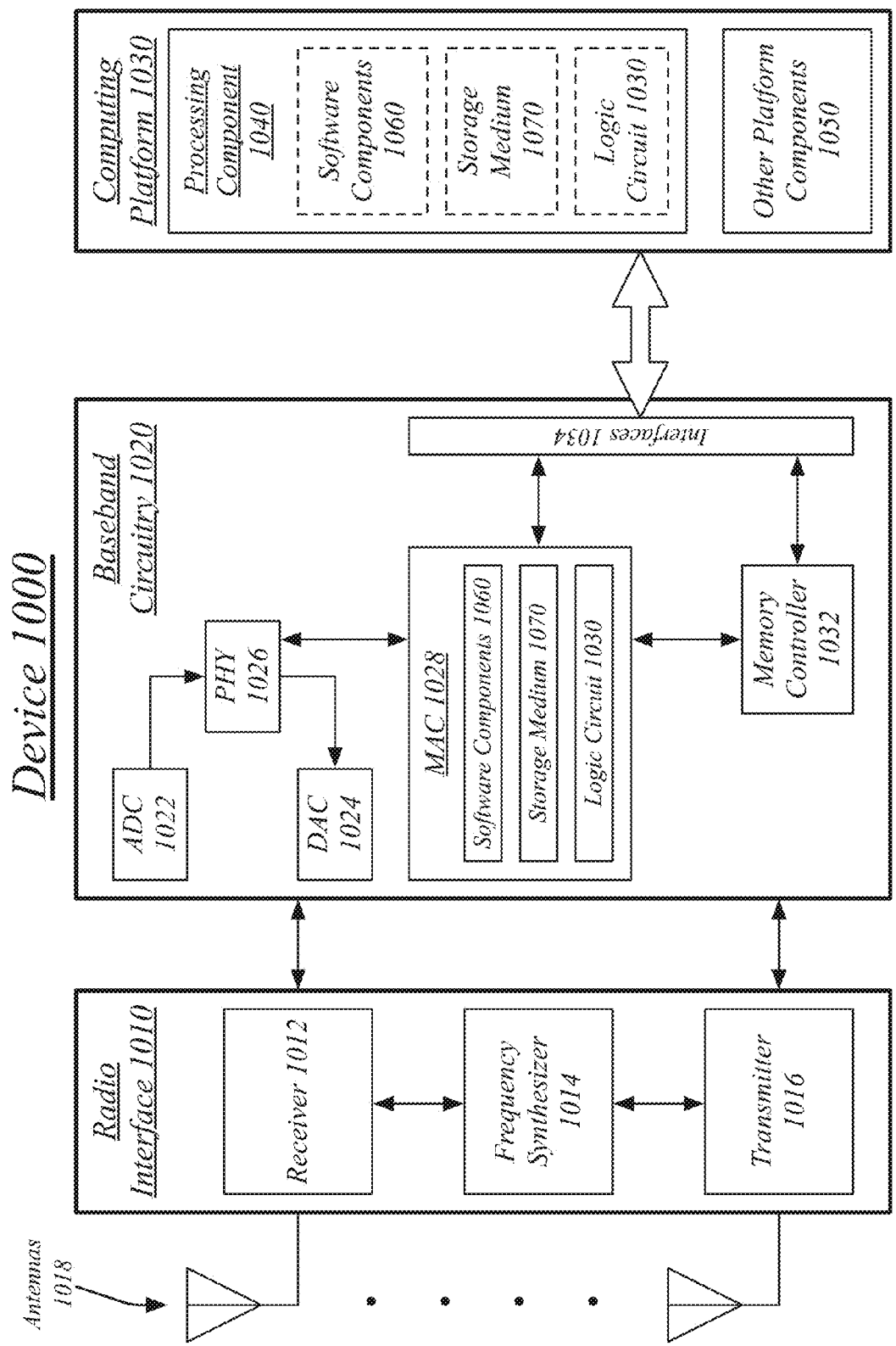
FIG. 10 illustrates an embodiment of a radio device architecture.

FIG. 10 illustrates an embodiment of a device 1000 for use in a multicarrier OFDM system, such as the data replication system 100. Device 1000 may implement, for example, software components 1060 as described with reference to data replication system 100 and/or a logic circuit 1030. The logic circuit 1030 may include physical circuits to perform operations described for the data replication system 100. As shown in FIG. 10, device 1000 may include a radio interface 1010, baseband circuitry 1020, and computing platform 1030, although embodiments are not limited to this configuration.

The device 1000 may implement some or all of the structure and/or operations for the data replication system 100 and/or logic circuit 1030 in a single computing entity, such as entirely within a single device. Alternatively, the device 1000 may distribute portions of the structure and/or operations for the data replication system 100 and/or logic circuit 1030 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1010 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1010 may include, for example, a receiver 1012, a transmitter 1016 and/or a frequency synthesizer 1014. Radio interface 1010 may include bias controls, a crystal oscillator and/or one or more antennas 1018. In another embodiment, radio interface 1010 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1020 may communicate with radio interface 1010 to process receive and/or transmit signals and may include, for example, an analog-to-digital converter 1022 for down converting received signals, a digital-to-analog converter 1024 for up converting signals for transmission. Further, baseband circuitry 1020 may include a baseband or physical layer (PHY) processing circuit 1056 for PHY link layer processing of respective receive/transmit signals. Baseband circuitry 1020 may include, for example, a processing circuit 1028 for medium access control (MAC)/data link layer processing. Baseband circuitry 1020 may include a memory controller 1032 for communicating with processing circuit 1028 and/or a computing platform 1030, for example, via one or more interfaces 1034.

In some embodiments, PHY processing circuit 1026 may include a frame construction and/or detection module, in combination with additional circuitry such as a buffer memory, to construct and/or deconstruct communication frames, such as radio frames. Alternatively or in addition, MAC processing circuit 1028 may share processing for certain of these functions or perform these processes independent of PHY processing circuit 1026. In some embodiments, MAC and PHY processing may be integrated into a single circuit.

The computing platform 1030 may provide computing functionality for the device 1000. As shown, the computing platform 1030 may include a processing component 1040. In addition to, or alternatively of, the baseband circuitry 1020, the device 1000 may execute processing operations or logic for the data replication system 100 and logic circuit 1030 using the processing component 1040. The processing component 1040 (and/or PHY 1026 and/or MAC 1028) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1030 may further include other platform components 1050. Other platform components 1050 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1000 described herein, may be included or omitted in various embodiments of device 1000, as suitably desired. In some embodiments, device 1000 may be configured to be compatible with protocols and frequencies associated one or more of the 3GPP LTE Specifications and/or IEEE 1002.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of device 1000 may be implemented using any combination of discrete circuitry, application specific integrated circuits (ASICs), logic gates and/or single chip architectures. Further, the features of device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise determining a sharing event for a data item, the sharing event associated with a source client device with a local storage of the data item; determining that network storage of the data item is scheduled for relocation from a source storage device; requesting the source client device upload the data item in response to the determination that network storage of the data item is scheduled for relocation; and de-scheduling the relocation of the data item from the source storage device.

A computer-implemented method may further comprise de-scheduling the relocation of the data item from the source storage device in response to receiving the data item from the source client device.

A computer-implemented method may further comprise the data item comprising one of an image file, video file, and audio file.

A computer-implemented method may further comprise wherein the data item is scheduled for relocation based on the source storage device being scheduled for deactivation.

A computer-implemented method may further comprise wherein the data item is scheduled for relocation based on automated media messaging popularity prediction determining that the data item is predicted to have a high media messaging rate.

A computer-implemented method may further comprise the data item stored at a first data center, wherein the data item is scheduled for relocation based on a data center migration between the first data center and a second data center.

A computer-implemented method may further comprise receiving the data item from the source client device; and storing the data item on the destination storage device.

A computer-implemented method may further comprise the network storage associated with a messaging service, the sharing event corresponding to a messaging of the data item from the source client device to a destination client device using the messaging service.

A computer-implemented method may further comprise requesting that the source client device upload the data item to the destination storage device as part of performance of the messaging.

A computer-implemented method may further comprise receiving a message package from the source client device, the message package comprising a data item hash of the data item and a storage length of the data item; determining a data item identifier for the data item based on the data item hash and the storage length of the data item; and identifying that the network storage contains the data item and that data item is scheduled for relocation based on the data item identifier.

A computer-implemented method may further comprise comparing the data item identifier to a data item reference record; and identifying that the network storage contains the data item and that the data item is scheduled for relocation from the source storage device.

A computer-implemented method may further comprise receiving the data item at a destination storage device from the source client device; receiving a download request for the data item from a destination client device; retrieving the data item from the destination storage device; and transmitting the data item to the destination client device.

A computer-implemented method may further comprise the download request comprising a resource locator, further comprising: receiving a message package from the source client device, the message package referencing the data item; generating a messaging delivery package based on the message package, the messaging delivery package comprising the resource locator; and transmitting the messaging delivery package to the destination client device.

An apparatus may comprise a processor circuit on a device; a messaging server component operative on the processor circuit to determine a sharing event for a data item, the sharing event associated with a source client device with a local storage of the data item, and request the source client device upload the data item in response to a determination that network storage of the data item is scheduled for relocation; and a storage management component operative to determine that the network storage of the data item is scheduled for relocation from a source storage device and de-schedule the relocation of the data item from the source storage device. The apparatus may be operative to implement any of the computer-implemented methods described herein.

A computer-implemented method may comprise transmitting a message package to a messaging server component, the message package comprising a data item hash of a data item and a storage length of the data item; receiving an upload request from the messaging server component, the upload request received in response to a determination that the data item is scheduled for relocation from a source storage device; and uploading the data item in response to the upload request.

An apparatus may comprise a processor circuit on a source client device; a local storage device operative to store a data item; a messaging endpoint operative on the processor circuit to transmit a message package to a messaging server component, the message package comprising a data item hash of the data item and a storage length of the data item; to receive an upload request from the messaging server component, the upload request received in response to a determination that the data item is scheduled for relocation from a source storage device; and to upload the data item in response to the upload request. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   determining a sharing event for a data item, the sharing event associated with a source client device with a local storage of the data item;
   determining that network storage of the data item is scheduled for relocation from a source storage device to a destination storage device;
   requesting the source client device upload the data item to the destination storage device using upload network bandwidth of the source client device in response to the determination that network storage of the data item is scheduled for relocation; and
   de-scheduling the relocation of the data item from the source storage device.

2. The method of claim 1, wherein the data item is scheduled for relocation based on automated media messaging popularity prediction determining that the data item is predicted to have a high media messaging rate.

3. The method of claim 1, the data item stored at a first data center, wherein the data item is scheduled for relocation based on a data center migration between the first data center and a second data center.

4. The method of claim 1, the network storage associated with a messaging service, the sharing event corresponding to a messaging of the data item from the source client device to a destination client device using the messaging service.

5. The method of claim 1, further comprising:
   receiving a message package from the source client device, the message package comprising a data item hash of the data item and a storage length of the data item;
   determining a data item identifier for the data item based on the data item hash and the storage length of the data item; and
   identifying that the network storage contains the data item and that data item is scheduled for relocation based on the data item identifier.

6. The method of claim 5, further comprising:
   comparing the data item identifier to a data item reference record; and
   identifying that the network storage contains the data item and that the data item is scheduled for relocation from the source storage device.

7. The method of claim 1, further comprising:
   receiving the data item at a destination storage device from the source client device;
   receiving a download request for the data item from a destination client device;
   retrieving the data item from the destination storage device; and
   transmitting the data item to the destination client device.

8. An apparatus, comprising:
   a processor circuit on a device;
   a messaging server controller operative to determine a sharing event for a data item, the sharing event associated with a source client device with a local storage of the data item, and request the source client device upload the data item to a destination storage device in response to a determination that network storage of the data item is scheduled for relocation from a source storage device to the destination storage device using upload network bandwidth of the source client device; and
   a storage management controller operative to determine that the network storage of the data item is scheduled for relocation from the source storage device and de-schedule the relocation of the data item from the source storage device.

9. The apparatus of claim 8, wherein the data item is scheduled for relocation based on automated media messaging popularity prediction determining that the data item is predicted to have a high media messaging rate.

10. The apparatus of claim 8, the data item stored at a first data center, wherein the data item is scheduled for relocation based on a data center migration between the first data center and a second data center.

11. The apparatus of claim 8, the network storage associated with a messaging service, the sharing event corresponding to a messaging of the data item from the source client device to a destination client device using the messaging service.

12. The apparatus of claim 8, further comprising:
the messaging server controller operative to receive a message package from the source client device, the message package comprising a data item hash of the data item and a storage length of the data item; and
the storage management controller operative to determine a data item identifier for the data item based on the data item hash and the storage length of the data item; and identify that the network storage contains the data item and that data item is scheduled for relocation based on the data item identifier.

13. The apparatus of claim 12, further comprising:
the storage management controller operative to compare the data item identifier to a data item reference record and identify that the network storage contains the data item and that the data item is scheduled for relocation from the source storage device.

14. The apparatus of claim 8, the download request comprising a resource locator, further comprising:
the messaging server controller operative to receive the data item at a destination storage device from the source client device, receive a download request for the data item from a destination client device, retrieve the data item from the destination storage device, and transmit the data item to the destination client device.

15. At least one non-transitory computer-readable storage medium comprising instructions that, when executed, cause a system to:
determine a sharing event for a data item, the sharing event associated with a source client device with a local storage of the data item;
determine that network storage of the data item is scheduled for relocation from a source storage device to a destination storage device;
request the source client device upload the data item to the destination storage device using upload network bandwidth of the source client device in response to the determination that network storage of the data item is scheduled for relocation; and
de-schedule the relocation of the data item from the source storage device.

16. The computer-readable storage medium of claim 15, wherein the data item is scheduled for relocation based on automated media messaging popularity prediction determining that the data item is predicted to have a high media messaging rate.

17. The computer-readable storage medium of claim 15, the data item stored at a first data center, wherein the data item is scheduled for relocation based on a data center migration between the first data center and a second data center.

18. The computer-readable storage medium of claim 15, the network storage associated with a messaging service, the sharing event corresponding to a messaging of the data item from the source client device to a destination client device using the messaging service.

19. The computer-readable storage medium of claim 15, comprising further instructions that, when executed, cause a system to:
receive a message package from the source client device, the message package comprising a data item hash of the data item and a storage length of the data item;
determine a data item identifier for the data item based on the data item hash and the storage length of the data item; and
identify that the network storage contains the data item and that data item is scheduled for relocation based on the data item identifier.

20. The computer-readable storage medium of claim 15, the download request comprising a resource locator, comprising further instructions that, when executed, cause a system to:
receive the data item at a destination storage device from the source client device;
receive a download request for the data item from a destination client device;
retrieve the data item from the destination storage device; and
transmit the data item to the destination client device.

* * * * *